Dec. 20, 1938.   C. L. FITZ   2,140,738
FILM GATE AND FRAMING MECHANISM
Filed April 18, 1936   3 Sheets-Sheet 1
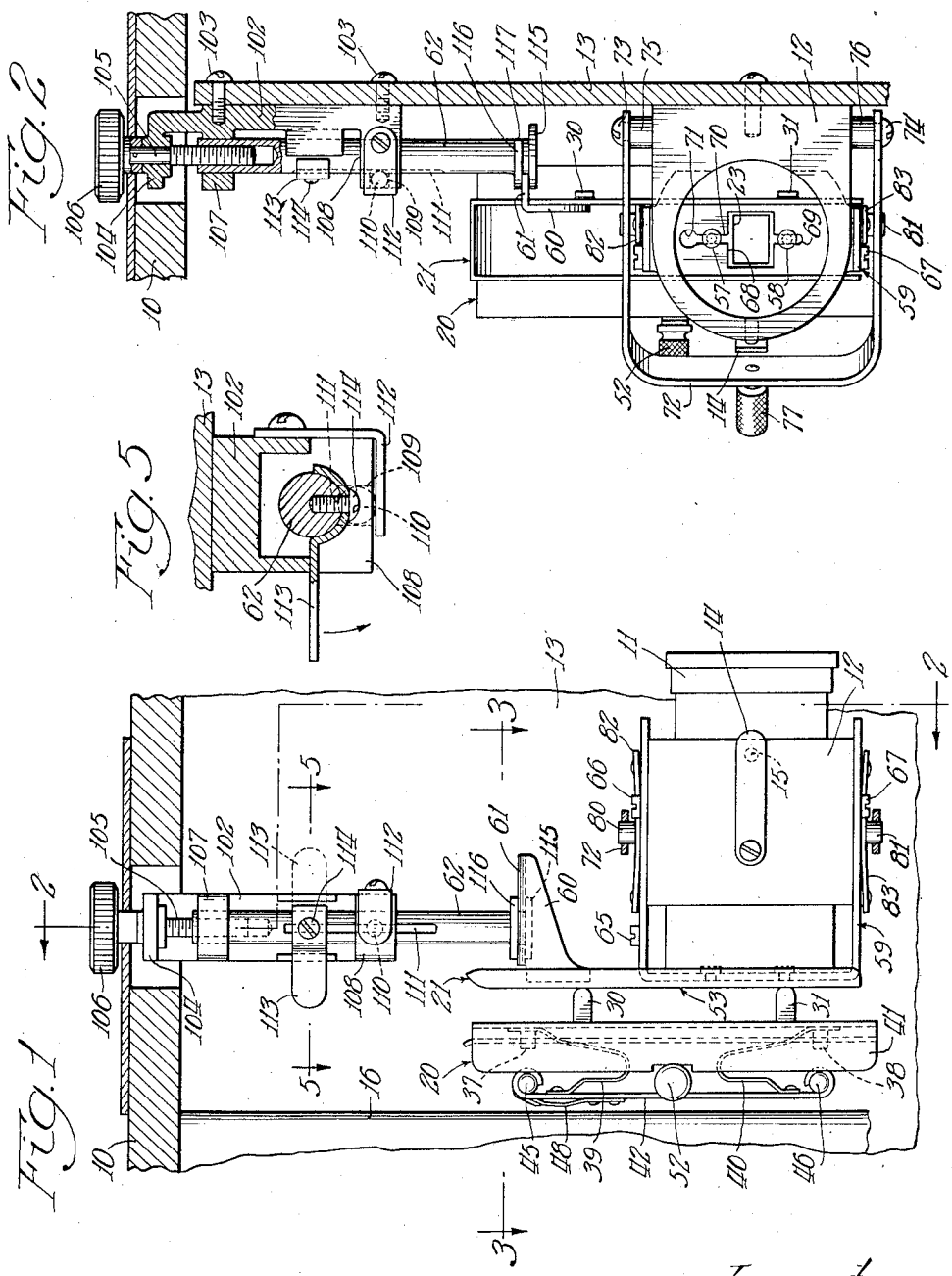
Inventor:
Charles L. Fitz.
By Zabel Carlson & Wells
Attys Dec. 20, 1938.　　　　C. L. FITZ　　　　2,140,738
FILM GATE AND FRAMING MECHANISM
Filed April 18, 1936　　　3 Sheets-Sheet 2

Inventor:
Charles L. Fitz.
By Gabel Carlson & Wells
Attys.

Dec. 20, 1938.   C. L. FITZ   2,140,738
FILM GATE AND FRAMING MECHANISM
Filed April 18, 1936   3 Sheets-Sheet 3

Inventor:
Charles L. Fitz.

Patented Dec. 20, 1938

2,140,738

UNITED STATES PATENT OFFICE 2,140,738

FILM GATE AND FRAMING MECHANISM

Charles L. Fitz, Chicago, Ill., assignor to Herman A. De Vry, Inc., Chicago, Ill., a corporation of Illinois Application April 18, 1936, Serial No. 75,093

5 Claims. (Cl. 88—17)

This invention relates to improvements in film gates and framing mechanism for motion picture machines.

It is the principal purpose of this invention to provide a novel construction of the film gate elements whereby to facilitate positioning of a film in a projector and the framing of the film by adjustment of the light aperture in the film gate.

The invention further contemplates a construction for film gates which facilitates ready cleaning of the various parts by providing a novel mounting therefor. This mounting permits ready removal of the several parts so that they may be cleaned and kept in the best condition at all times.

The invention further contemplates a novel combination between a movable film gate element and a framing device whereby the light aperture in the film gate element may be readily adjusted for framing purposes.

Other and more detailed objects and advantages will appear as the description proceeds reference being had to the accompanying drawings wherein the preferred form of the invention is shown. It is to be understood, however, that the drawings and description are illustrative only and are not to be taken as limiting the invention except in so far as it is limited by the claims.

In the drawings—

Fig. 1 is a fragmentary sectional view through a portion of a projector casing illustrating a film gate and framing mechanism embodying the invention;

Fig. 2 is a sectional view on the line 2—2 of Fig. 1, certain parts being removed for the sake of clearness;

Fig. 5 is an enlarged sectional view on the line 5—5 of Fig. 1;

Figure 3:
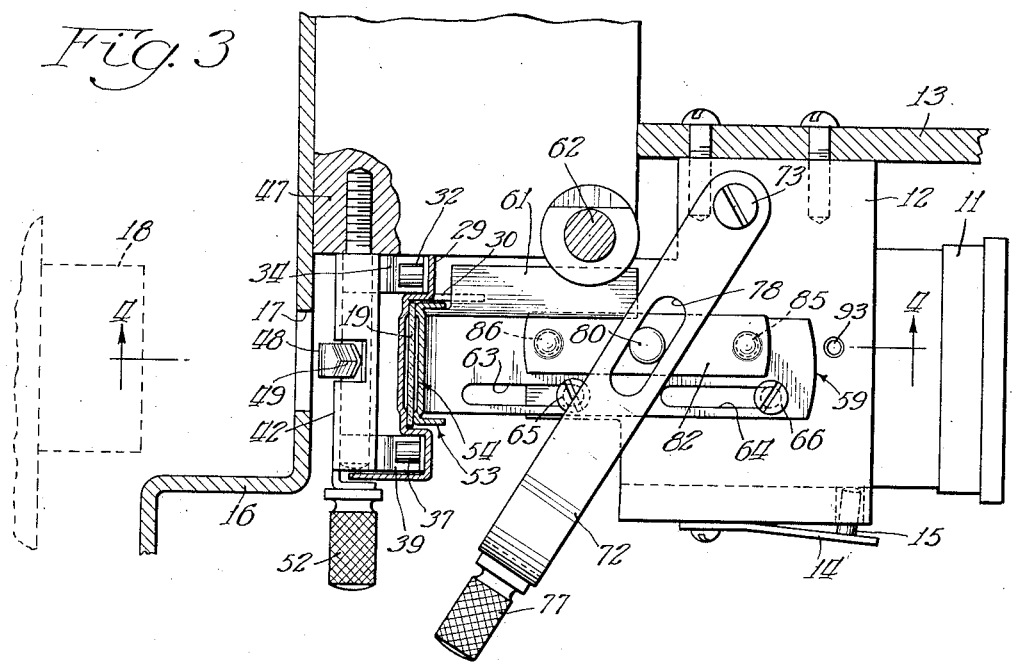
Fig. 3 is an enlarged sectional view taken substantially on the line 3—3 of Fig. 1.

Referring now in detail to the drawings, I show the invention as applied to a motion picture projector having a casing 10 and having a projection lens 11 mounted in a suitable housing 12 that is secured to a wall 13 in the projector casing. The projection lens 11 may be adjusted in the housing and may be desirably held in any suitable position by a spring 14 which is mounted upon the housing 12 and which carries a pin 15 that projects through the housing 12 and engages the barrel of the lens 11.

Spaced from the housing 12 is a partition wall 16 (see Figs. 1 and 3) which is provided with a light aperture 17 adapted to receive light from a suitable light source, not shown, through a condenser lens 18 indicated in dotted lines in Fig. 3. As is customary in machines of this character, suitable means, not shown, are provided for directing a film 19 between the light aperture 17 and the projection lens 11. It is also customary to provide a film guiding means which is normally termed a film gate for guiding the film as it passes between the light aperture 17 and the lens 11 and for providing a light aperture of exact dimensions closely adjacent to the film.

The present invention provides a film gate consisting of a pair of film gate members 20 and 21 between which the film 19 is guided. The film gate member 20 has a large aperture 22 for light, this aperture being aligned with the aperture 17 when the gate member 20 is in operative position. The film gate member 21 is provided with a smaller aperture 23 which aperture is properly dimensioned and defines the area on the film that will be projected upon the screen. The film gate members 20 and 21 are movable as will be hereinafter more fully described. The member 21 is vertically movable for framing purposes and is also movable toward and away from the member 20 to facilitate insertion of the film 19 therebetween.

Figure 4:
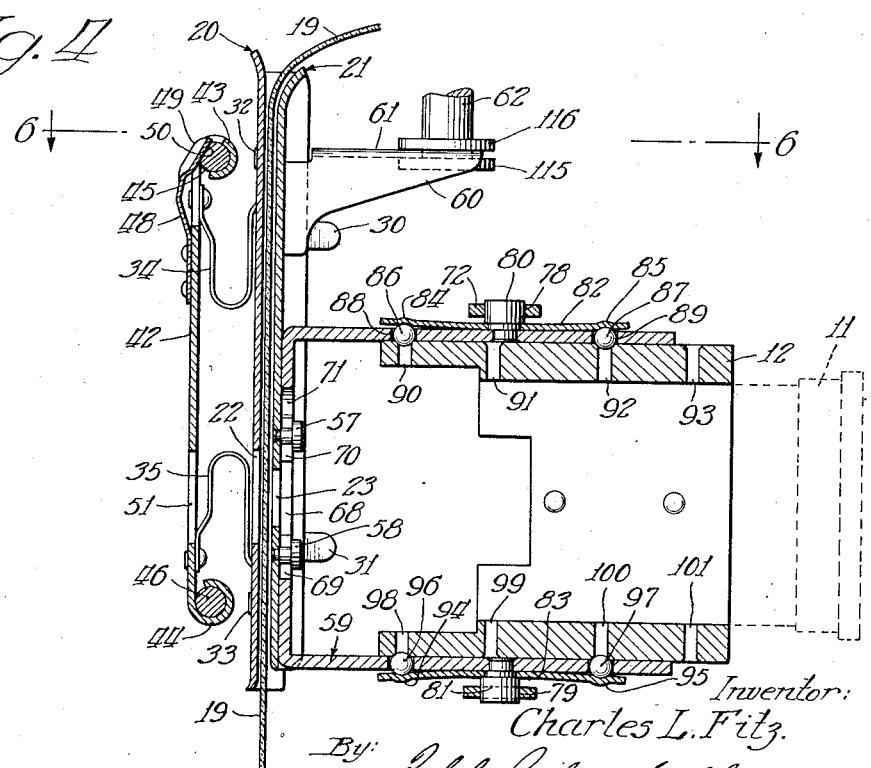
Fig. 4 is a sectional view on the line 4—4 of Fig. 3.
Figure 6:
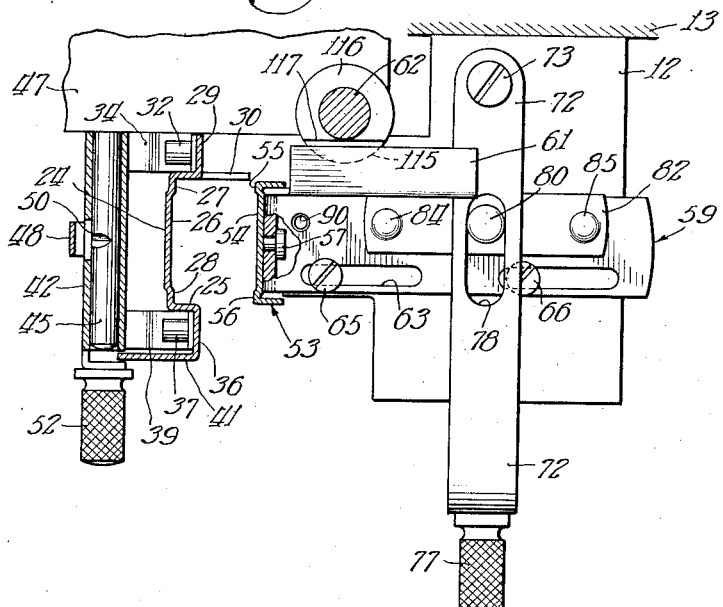
Fig. 6 is a sectional view on the line 6—6 of Fig. 4 showing a changed position of the mechanism from that shown in Fig. 3.
Figure 7:
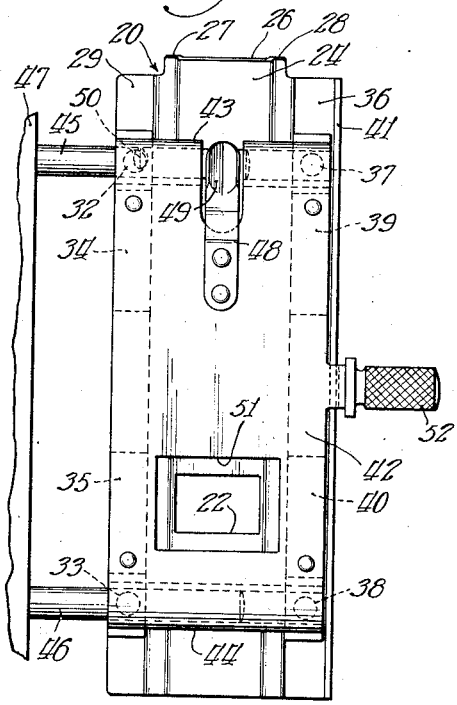
Fig. 7 is an enlarged fragmentary view in elevation of one part of the film gate mechanism.
Figure 8:
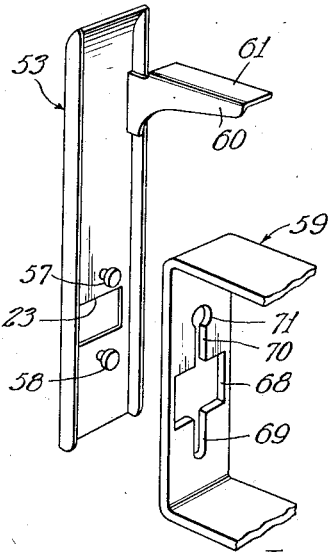
Fig. 8 is a perspective view of another section of the gate mechanism showing the parts separated to indicate the structure thereof.

Referring now more particularly to the gate member 20, this member is composed of a sheet metal plate 24 which is bent into the form shown best by Figs. 3, 4, and 6 so that it has a vertically running channel 25 provided with a smaller recess 26 in which the film 19 is spaced from the wall of the channel leaving the film to ride upon a pair of relatively narrow strips 27 and 28 outside of the picture area on the film. The plate 24 is further provided with a flange 29. The flange 29 has struck up therefrom a pair of lugs 30 and 31 which act as stop means to prevent an operator from pushing the film 19 beyond its proper position in the film gate. On the back side of the flange 29, there are a pair of studs 32 and 33 which act to secure a pair of springs 34 and 35 to the plate 24. Across the channel 25 from the flange 29, the plate 24 is provided with a second flange portion 36 which is substantially aligned with the flange 29 and which also carries a pair of studs 37 and 38 that mount a pair of springs 39 and 40 to the plate 24. The flange 36 is bent at right angles to provide a shield 41 that projects rearwardly toward the wall 16 to act as a shield for the spring mechanism and to prevent the operator from contacting this mechanism with a film.

The springs 34, 35, 39, and 40 connect the plate 24 to a mounting plate 42. This plate has its upper and lower ends 43 and 44 curled about a pair of mounting posts 45 and 46. These posts are secured by screw threading them into a block 47 fixed in the projector housing. The plate 42 carries a spring 48 which has a V-shaped end 49 adapted to snap into a notch 50 provided in the upper post 45. The purpose of the spring 48 and the notch 50 is, of course, to determine the normal operating position of the plate 42. The plate 42 is provided with an opening 51 for passage of light to the film 19 as will be readily understood. For detaching the gate member 20 from the mounting posts 45 and 46, the plate 42 has secured thereto a knurled handle 52.

The gate member 21 comprises a plate 53 which plate is recessed on its film receiving face to provide a depression 54 between a pair of bearing surfaces 55 and 56. The bearing surfaces 55 and 56 cooperate with the portions 27 and 28 on the plate 24 to guide the film 19 while the depressions at 54 and 26 leave the picture portion of the film untouched as it passes through the gate. The plate 53 has a pair of headed pins 57 and 58 by means of which it is mounted upon a U-shaped bracket 59. The plate 53 also carries a projection 60 having a horizontally running elongated flange 61 by means of which this plate is connected to a movable framing element 62 for moving the plate 53 up and down and properly framing the pictures on the film.

The U-shaped bracket 59 is slidably mounted upon the housing 12 by means of a plurality of slots 63 and 64 in each leg of the member 59 and headed screws 65, 66, and 67 secured in the housing 12. The bracket 59 is provided with a suitable aperture at 68 larger than the aperture 23 in the plate 53 so that the plate 53 may be moved vertically with respect to the bracket 59 without having the bracket 59 cover any portion of the aperture 23. The bracket 59 is further provided with a downwardly extending slot 69 running from the opening 68 and an upwardly extending slot 70 extending from the opening 68. The upwardly extending slot 70 terminates in an enlarged circular opening 71 that is sufficiently large enough to receive the head of the pin 57.

Thus the plate 53 may be readily detached from or attached to the bracket 59 by aligning the pin 57 with the circular opening 71 and pushing the plate 53 toward the bracket. The pin 58 will pass through the opening 68, and then the plate 53 can be moved downwardly to bring the shank portions of the pins 57 and 58 into the slots 70 and 69, respectively.

In order to attach the plate 53 to the bracket 59 or to detach it therefrom, it is necessary to properly position the framing member 62, as will be more clearly explained hereinafter. The bracket 59 is moved toward and away from the gate member 20 by means of a hand lever 72 which is U-shaped and has the ends of the legs thereof connected by means of a pair of screws 73 and 74 onto studs 75 and 76, at the upper and lower surfaces of the housing 12. A finger piece 77 is provided on the lever 72, and the legs of the lever are slotted as indicated at 78 and 79 to receive a pair of studs 80 and 81 that are fixed to the legs of the bracket 59.

Thus, by swinging the hand lever 72 from the position shown in Fig. 3 to the position shown in Fig. 6, the bracket 59 and the gate member 21 may be moved to the right so as to separate the gate members 20 and 21 for the insertion of film.

Means are provided to releasably hold the gate member 21 in either open or closed position. The studs 80 and 81, in addition to forming pivots for the hand lever 72, secure the central portions of a pair of springs 82 and 83 to the lugs of the bracket 59. The spring 82 has a pair of depressions 84 and 85 therein adapted to bear upon balls 86 and 87 that are located in apertures 88 and 89 in the upper leg of the bracket 59. The projector lens housing 12 has four holes in the top thereof as indicated at 90, 91, 92, and 93 (see Fig. 4). These holes provide seats for the balls 86 and 87 as the holes are slightly countersunk. The spring 83 has depressions at 94 and 95 for engaging balls 96 and 97 and for pressing them into holes 98, 99, 100, and 101 provided in the lower part of the housing 12.

In the position shown in Fig. 4, the structure just described releasably holds the gate member 21 in closed position. When the gate member 21 is moved to open position, the balls 86 and 96 are moved from the holes 90 and 98, respectively, to the holes 91 and 99. The balls 87 and 97 are moved to the holes 93 and 101. This locks the gate member 21 in open position as will be readily understood.

Referring now to the framing mechanism, the framing element 62 is slidable vertically in a mounting bracket 102 that is secured to the partition wall 13 by screws 103. The bracket 102 has a top flange 104 in which a framing screw 105 is rotatably mounted. The framing screw 105 is screw threaded into the top of the framing element 62 and has a knurled knob 106 pinned thereto so that it may be rotated to raise and lower the framing element 62. The bracket 102 has an upper bearing 107 and a lower bearing 108 for the framing element 62. The lower bearing 108 has an aperture 109 therein housing a ball 110 which ball seats in a groove 111 in the framing element 62 to releasably hold the framing element 62 against rotation when the screw 105 is being turned to raise and lower the element 62. A spring 112 is secured to the bracket 102 and presses against the ball 110 to hold the ball in the groove 111.

Between the bearings 107 and 108, the framing element 62 has a finger piece 113 secured thereto by means of a screw 114. This finger piece is used to turn the framing element 62 for a purpose which will now be described. At its lower end, the element 62 has a flat head 115 which is circular, and above the circular head 115 a flange 116 is provided. The flange 116, however, is cut away at 117 so that, when the element 62 is turned by means of the finger piece 113 from the position shown in Fig. 2 to the position shown in Fig. 6, the flange 116 no longer overlies the flange 61 on the bracket 60.

With the parts in the position shown in Fig. 6, it is obvious that the gate member 21 can be lifted up by hand until the headed pin 57 is aligned with the circular opening 71 in the bracket 59 and then the gate member 21 can be detached and cleaned with no difficulty. It is believed to be evident also that the gate member 20 can be readily withdrawn for cleaning purposes by pulling the plate 42 off of the mounting posts 45 and 46. For opening and closing the film gate, the operator need only operate the hand lever 72 as will be readily understood. Once the film is in position, as shown in Figs. 3 and 4, with the film gate closed thereon, the aperture 23 in the plate 53 of the gate member 21 may be moved up and down to properly frame the picture by turning the knurled knob 106 which will raise or lower the framing element 62. The vertical movement of the framing element 62 is communicated to the plate 53 by means of the head 15 and the flange 116 on the element 62 and the flange 61 on the bracket 60.

From the above description, it is believed that the construction and operation of this device will be readily apparent to those skilled in this art.

Having thus described one specific form of the invention, what I claim as new and desire to secure by Letters Patent is:

1. In a film gate and framing mechanism for motion picture machines, a frame, a pair of film gate members, means movably mounting one of said members upon the frame for movement laterally out of alignment with the other gate member, a support for the other of said members, means mounting said support for movement toward and away from the first named gate member, the second named gate member being adjustable on its support, and manually operable means for adjusting said second named gate member, said manually operable means comprising a bracket on said second named gate member, a framing stem having means releasably engaging said bracket, and means for adjusting said stem.

2. In a motion picture projector, a frame, a projection lens carried by said frame, and a film gate for guiding film between said projection lens and a light source, said film gate comprising a pair of film gate members, means mounting one of said members on the frame, a bracket supporting the other of said members, a housing supporting said projection lens on the frame, means on said housing slidably supporting said bracket, and means for sliding said bracket on the housing to open and close the film gate, the film gate member carried by said bracket being movable on the bracket lengthwise of the film gate, and manually operable means releasably engaging said last named film gate member for moving it lengthwise of the film gate, said manually operable means being slidably mounted on the frame.

3. In a film gate mechanism for motion picture machines, a frame, a pair of film gate members, a support for one of said members, means mounting said support on said frame for movement toward and away from the other gate member, and means removably mounting the other gate member comprising a mounting plate, spring means thereon supporting the gate member, spaced posts projecting from said frame, said mounting plate having portions slidable on said posts.

4. In a film gate mechanism for motion picture machines, a frame, a pair of film gate members, a support for one of said members, means mounting said support on said frame for movement toward and away from the other gate member, and means removably mounting the other gate member comprising a mounting plate, spring means thereon supporting the gate member, spaced posts projecting from said frame, said mounting plate having portions slidable on said posts, one of said posts having a notch therein and said plate having a spring latch thereon adapted to seat in said notch.

5. In a motion picture projector, a frame, a projection lens carried by said frame, and a film gate for guiding film between said projection lens and a light source, said film gate comprising a pair of film gate members, means mounting one of said members on the frame, a bracket supporting the other of said members, a housing supporting said projection lens on the frame, means on said housing slidably supporting said bracket, and means for sliding said bracket on the housing to open and close the film gate, the bracket supported gate member having headed pins thereon, and said bracket having a slot for said pins with enlargements in the slot whereby said member is adjustable lengthwise of the gate on said bracket and removable from the bracket in one position of adjustment.

CHARLES L. FITZ.